United States Patent
Huh et al.

(10) Patent No.: US 9,207,989 B2
(45) Date of Patent: Dec. 8, 2015

(54) SYSTEM AND METHOD FOR PROVIDING VIRTUAL DEVICE

(75) Inventors: Eui N. Huh, Yongin-si (KR); Sang H. Na, Yongin-si (KR); Sung W. Kim, Yongin-si (KR); Jun H. Lee, Sungnam-si (KR)

(73) Assignee: INTELLECTUAL DISCOVERY CO., LTD., Seoul (KR)

( * ) Notice: Subject to any disclaimer, the term of this patent is extended or adjusted under 35 U.S.C. 154(b) by 365 days.

(21) Appl. No.: 13/592,133

(22) Filed: Aug. 22, 2012

(65) Prior Publication Data

US 2013/0159392 A1   Jun. 20, 2013

(30) Foreign Application Priority Data

Dec. 19, 2011   (KR) .................. 10-2011-0137625
Jan. 2, 2012   (KR) .................. 10-2012-0000249

(51) Int. Cl.
  *G06F 15/16* (2006.01)
  *G06F 9/50* (2006.01)
(52) U.S. Cl.
  CPC .................. *G06F 9/5072* (2013.01)

(58) Field of Classification Search
  USPC ............................................ 709/203
  See application file for complete search history.

(56) References Cited

U.S. PATENT DOCUMENTS

| | | | |
|---|---|---|---|
| 2011/0087726 A1* | 4/2011 | Shim | G06F 9/5072 |
| | | | 709/203 |
| 2013/0080623 A1* | 3/2013 | Thireault | 709/224 |
| 2013/0091284 A1* | 4/2013 | Rothschild | 709/226 |

* cited by examiner

*Primary Examiner* — Tu Nguyen
(74) *Attorney, Agent, or Firm* — Rothwell, Figg, Ernst & Manbeck, P.C.

(57) ABSTRACT

Disclosed is a system and method for providing a virtual terminal. A virtual cloud server may configure a plurality of virtual terminals by employing a virtual machine in a cloud environment. The virtual cloud server may provide an application of a heterogeneous platform to a terminal that accesses the virtual cloud server. A cooperative middleware apparatus may determine a cloud server suitable for a mobile terminal among a plurality of cloud servers, based on content information of content and virtual terminal information stored in the plurality of cloud servers.

7 Claims, 10 Drawing Sheets

SYSTEM AND METHOD FOR PROVIDING VIRTUAL DEVICE

TECHNICAL FIELD

The following embodiments relate to virtualization technology, and more particularly, to a system and method for providing a virtual terminal.

BACKGROUND ART

With advancement of information society, access to information has been further accelerated and an amount of access to the information has been increasing. Also, enhancement of hardware performance and an increase in a degree of integration of an electronic circuit have made it possible to produce further smaller hardware.

With such development in technology, small and high performance terminals such as a smart phone, a tablet, and a personal computer (PC) that enable computing and the Internet have been widely distributed. Such terminal enables a user to access information without restrictions on a time and an occasion by providing access to a computing environment and the Internet.

In order to provide a service, a terminal may use a variety of applications (App) based on a service to be provided. An application may not be independently executed in the terminal. The application may be executed on a platform that is an operating system (OS) of the terminal. Accordingly, the application needs to be developed based on a development interface and a development language that are provided by a supplier of a predetermined platform. The developed application may be executed only on the predetermined platform.

Currently commercialized representative platforms may be iOS of Apple, Android of Google, and Windows Mobile of Microsoft. The above platforms have been produced based on a personal PC environment having OSs, such as Mac, Linux, and Windows, respectively. An application of each platform has been developed using a computer programming language that is provided based on an OS corresponding to a platform. Accordingly, each of applications may use a different development language and a different application programming interface (API).

It is very complex and inconvenient to configure a single application environment by unifying different application languages and APIs. Also, when configuring the single application environment, it may not make the most of characteristics of each platform of a terminal.

High-tech mobile terminals such as a smart phone, a tablet, and a PC may use high performance computing resources through cloud computing without restrictions on a time and an occasion. Also, a personal cloud service for using a variety of services such as synchronization, storage, and restoration of personal data and contents has been developed.

As cloud computing can be expected to be in the mainstream of future mobile computing, a variety of cloud services may be integrated into a mobile terminal. A mobile cloud indicates combination of a cloud service and mobile computing. In response to providing of a mobile cloud environment, research on a zero-client and thin client model using a mobile terminal is ongoing in order to overcome platform dependency of the mobile terminal, functional constraints, and constraints of performance by employing the mobile cloud environment.

Unlike an existing computing environment depending on independent hardware performance of each terminal, cloud computing refers to technology that integrates resources of computers present in different physical locations using virtualization technology, and provides the integrated resource. As clouding computing is used, a program or a document individually stored in a PC and a server of a company may be stored in a large-scale computer accessible through the Internet. In order to use a cloud service such as a web browser of a mobile terminal, a user may execute a required application and may perform a desired work through the executed application.

A thin client system is a concept in which 1) a user terminal includes a minimum required number of apparatuses, and 2) a central server is in charge of storing and processing data and executing software. Currently, the thin client system may realize desktop virtualization that is representative cloud computing technology generally.

In desktop virtualization technology, a client may be managed through session management technology of a server or a virtual machine that is driven in the server, and the like. Execution of software may be completely performed in a server or a virtual machine of the server. A result screen that is generated in response to execution of software may be transmitted to a terminal of the client.

By applying thin client technology based on cloud computing, it is possible to overcome a disadvantage of a mobile terminal having a relatively short amount of resources.

However, since a variety of services are provided at the same time in which a concept of a mobile cloud has been established, platform dependency such as mutual compatibility between services, portability, and security becomes an issue.

DISCLOSURE OF INVENTION

Technical Goals

An aspect of the present invention provides technology of providing a variety of application services by configuring a platform dependent application on a cloud, and by executing the configured application on a personalized heterogeneous platform.

Another aspect of the present invention also provides technology of enabling an inter-cloud service and enhancing mutual compatibility between content and a mobile operating system (OS) and portability.

Technical Solutions

According to an aspect of the present invention, there is provided a system for providing a virtual terminal service, the system including: a virtual cloud server to configure a plurality of virtual terminals by employing a virtual machine in a cloud environment. The virtual cloud server may provide an application of a heterogeneous platform to a terminal that accesses the virtual cloud server, and the heterogeneous platform may be a virtual platform of a virtual terminal in which the application requested by the terminal is present, among the plurality of virtual terminals, and may be a platform of a heterogeneous terminal having a type different from a type of the terminal.

The virtual terminal service providing system may further include a managing server to authenticate the terminal, and to transfer, to the terminal, a location address of a virtual gateway of the virtual cloud server in which the application of the heterogeneous platform is present.

The managing server may identify the virtual terminal in which the application requested by the terminal is present, from among the plurality of virtual terminals based on information received from the terminal.

The virtual cloud server may enable the terminal to access the platform of the heterogeneous terminal by employing a thin client technology.

The virtual terminal service providing system may further include a personal cloud storage to provide sharing and synchronization of data between a platform of the terminal and the heterogeneous platform.

The virtual terminal service providing system may further include a market server to provide applications of a plurality of virtual platforms of the plurality of virtual terminals.

The terminal may purchase the application of the heterogeneous platform from the market server.

The market server may transfer an execution file of the application to the heterogeneous platform.

According to another aspect of the present invention, there is provided a method of providing an application of a heterogeneous platform to a terminal, the method including: configuring a plurality of virtual terminals by employing a virtual machine in a cloud environment; and providing the application of the heterogeneous platform to the terminal.

The heterogeneous platform may be a virtual platform of a virtual terminal in which the application requested by the terminal is present, among the plurality of virtual terminals, and may be a platform of a heterogeneous terminal having a type different from a type of the terminal.

According to still another aspect of the present invention, there is provided a cooperative middleware apparatus, including: a connection relay module to receive a request for content from a mobile terminal, and to transfer an access link to the mobile terminal; and a resource managing module to determine a cloud server suitable for the mobile terminal among a plurality of cloud servers, based on content information of the content and virtual terminal information stored in the plurality of cloud servers, to generate the access link that enables an access to a virtual terminal of the determined cloud server, and to transfer the generated access link to the connection relay module.

When the content is absent in the determined cloud server, the resource managing module may determine migration of the content to the determined cloud server from another cloud server in which the content is present among the plurality of cloud servers.

The resource managing module may request the determined cloud server for the migration of the content.

The resource managing module may verify an allocation state of virtual terminals of the determined cloud server, and may determine whether to allocate a new virtual terminal based on the verified allocation state.

The resource managing module may request the determined cloud server to allocate the new virtual terminal.

The resource managing module may monitor quality of a service of content that is provided by the determined cloud server to the mobile terminal.

The connection relay module may authenticate the mobile terminal based on personal information of a user of the mobile terminal that is stored in the connection relay module.

The connection relay module may monitor a communication state between the mobile terminal and the determined cloud server.

The virtual terminal of the determined cloud server may be capable of executing the content among virtual terminals allocated within the determined cloud server.

According to a further another aspect of the present invention, there is provided a content providing method, including: receiving a request for content from a mobile terminal; determining a cloud server suitable for the mobile terminal among a plurality of cloud servers, based on content information of the content and virtual terminal information stored in the plurality of cloud servers; generating the access link that enables an access to a virtual terminal of the determined cloud server; and transferring the generated access link to the mobile terminal.

The content providing method may further include determining migration of the content to the determined cloud server from another cloud server in which the content is present among the plurality of cloud servers when the content is absent in the determined cloud server.

The content providing method may further include verifying an allocation state of virtual terminals of the determined cloud server, and determining whether to allocate a new virtual terminal based on the verified allocation state.

Effect of the Invention

According to embodiments, a user may use an application of a different platform using a platform of a terminal being used by the user.

Also, according to embodiments, a user may use an application of a platform of a heterogeneous terminal through configuration of an application market that does not apply constraint of a platform with respect to all of the terminals.

Also, according to embodiments, a user may share and synchronize data, which is generated when using an application of a platform of a heterogeneous terminal, in real time with a platform of a terminal of the user. Accordingly, the user may be provided with the same data regardless of an application of a platform used by the user.

Also, according to embodiments, a platform market may provide an integrated application market in which different platforms are integrated and thus, further various applications may be provided to a user.

Also, according to embodiments, content migration between a plurality of cloud servers is enabled using cooperative middleware.

Also, according to embodiments, by enhancing mutual compatibility between content and a mobile operating system (OS) and portability, content may be provided regardless of a type of content and an OS of a mobile terminal.

Also, according to embodiments, cooperative middleware may be employed as a required element to construct an open cloud environment and an in-company cloud environment and to manage resources.

BEST MODE FOR CARRYING OUT THE INVENTION

Figure 1:
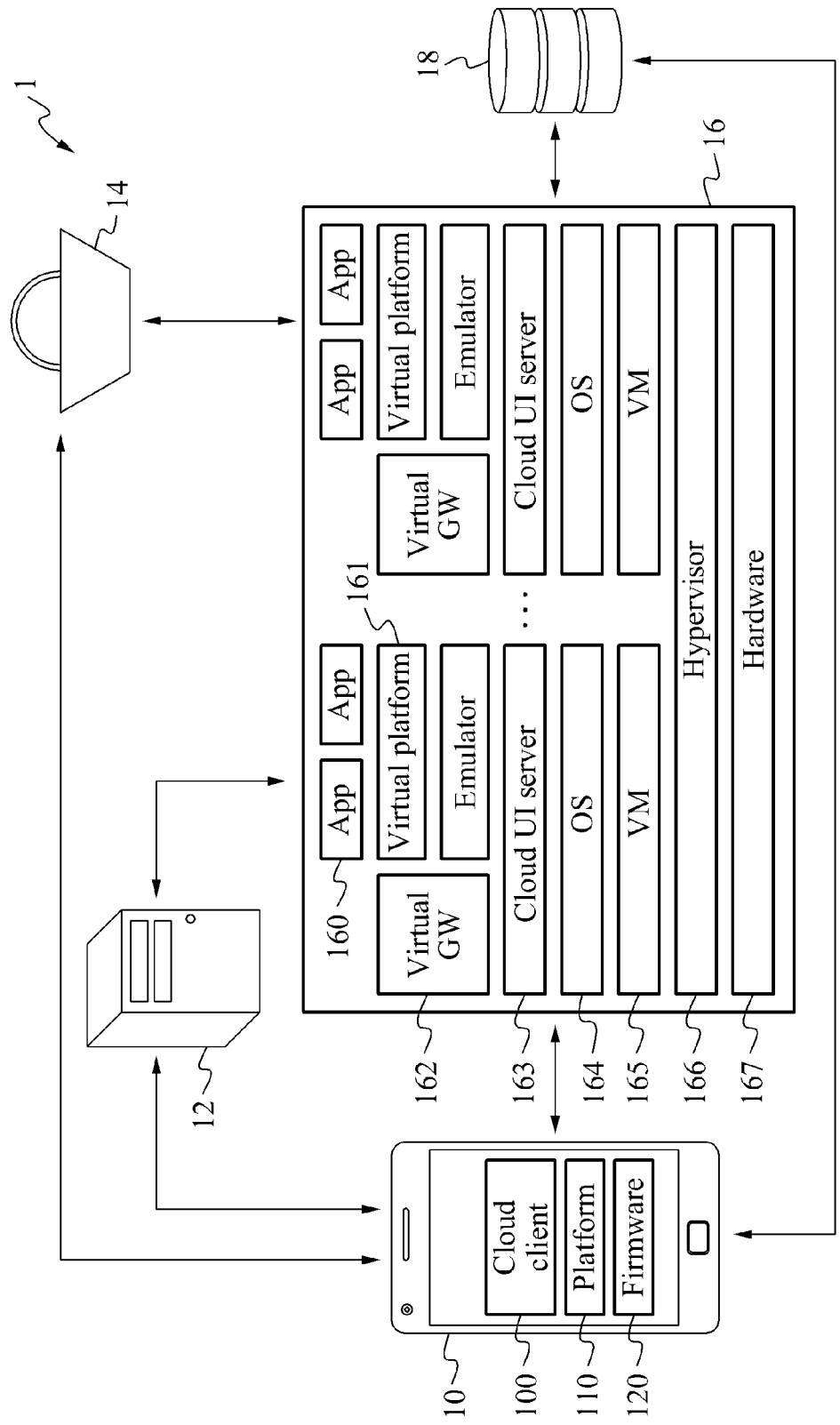
FIG. 1 is a block diagram illustrating a configuration of a system for providing a virtual terminal service according to an embodiment.

Reference will now be made in detail to embodiments of the present invention, examples of which are illustrated in the accompanying drawings, wherein like reference numerals refer to the like elements throughout. The embodiments are described below in order to explain the present invention by referring to the figures. When it is determined detailed description related to a related known function or configuration they may make the purpose of the present invention unnecessarily ambiguous in describing the present invention, the detailed description will be omitted here. Also, terminologies used herein are defined to appropriately describe the exemplary embodiments of the present invention and thus may be changed depending on a user, the intent of an operator, or a custom. Accordingly, the terminologies must be defined based on the following overall description of this specification.

FIG. 1 is a block diagram illustrating a configuration of a system 1 for providing a virtual terminal service (hereinafter, virtual terminal service providing system) according to an embodiment of the present invention.

Referring to FIG. 1, the virtual terminal service providing system 1 may include a terminal 10, a managing server 12, a market server 14, a virtual cloud server 16, and a personal cloud storage 18.

The managing server 120 may be a server configured to provide an authentication service and a virtual mobile platform service. The market server 140 may be a server configured to provide a platform integrated application.

The virtual cloud server 16 may be a set of at least one server. The virtual cloud server 16 may be a virtual cloud network to which the at least one server is connected.

The terminal 10 may be a terminal that is used by a user. The terminal 10 may be a mobile terminal including a smart phone. The terminal 10 may include a cloud client 100, a platform 110, and firmware 120.

The cloud client 100 of the terminal 10 may access a virtual gateway 162 of the virtual cloud server 16, and may receive an application of a heterogeneous platform from the virtual gateway 162 of the virtual cloud server 16. Here, the heterogeneous platform may be a platform of a heterogeneous terminal having a type different from a type of the terminal 10. A heterogeneous platform and a platform of a terminal may indicate platforms in which an application and the like is incompatible.

The managing server 12 may receive terminal information and user information from the terminal 10, and may authenticate the terminal 10 and the user of the terminal 10 based on the received terminal information and user information. The managing server 12 may transfer, to the terminal 10, a location address of the virtual gateway 162 in which an application of a heterogeneous platform desired by the terminal 10 is present. Through the above transfer, the managing server 12 may control the cloud client 100 of the terminal 100 to be accessible to the virtual gateway 162.

The virtual cloud server 16 may configure a plurality of virtual terminals by employing a virtual machine in a cloud environment. The aforementioned heterogeneous platform may be a virtual platform of a virtual terminal in which an application requested by a terminal is present, among the plurality of virtual terminals.

Each of the plurality of virtual terminals may include or execute an application (App) 160, a virtual platform 161, the virtual gateway 162, a cloud user interface (UI) server 163, an operating system (OS) 164, and a virtual machine (VM) 165. Each of the plurality of virtual terminals may include or execute a common hypervisor 166. Each of the plurality of virtual terminals may further include an emulator to execute a virtual platform. The application 160 may operate on the virtual platform 161. Each of the plurality of virtual terminals may include common hardware 167. Here, the common hypervisor 168 may indicate that a single hypervisor executed in the virtual cloud server 16 is shared between the plurality of virtual terminals. The common hardware 167 may indicate that hardware of the virtual cloud server 16 is shared between the plurality of virtual terminals and thereby is used.

The virtual gateway 162 of the virtual terminal may transfer a screen of the virtual terminal to the cloud server 163. The virtual gateway 162 may configure an application that is purchased by the terminal 10 through the market server 14. The hypervisor 166, as thin layer software, may perform virtualization of the common hardware 167 and provide virtualized hardware to the VM 165.

The virtual cloud serer 16 may perform virtualization of the hardware 167 using cloud technology, and may configure an environment of the platform of the terminal on the virtualized hardware 167. Cloud network technology may be communication network technology of providing a variety of applications to the user based on an on-demand scheme by integrating the plurality of virtual terminals using the virtualization technology. The virtual cloud server 16 may employ thin client technology that enables the terminal 10 to access platforms of different environments through a network. The virtual cloud server 16 enables the terminal 10 to access a platform of a virtual terminal having a type different from a type of an actual platform of the terminal 10. Here, the platform of the virtual terminal having the different type may be a platform of a heterogeneous terminal.

The thin client technology may indicate a scheme in which a terminal depends on a central server in using an application and data. For example, referring to FIG. 1, through the thin client technology, the terminal 10 may download all of the application programs from a central server, and may obtain all of the data. The terminal 10 may store, in the central server, all of the modified matters such as data modified in response to an operation of the terminal 10 and the like.

To provide a variety of applications, the market server 140 to provide an integrated application of different platforms may be configured. Here, the different platforms may be a plurality of virtual platforms of the plurality of virtual terminals. An application of each of the plurality of platforms may be provided to the terminal 10 through the virtual gateway 162.

The market server 14 may be a store for providing applications of the plurality of platforms. The cloud client 100 of the terminal 10 may access the market server 14 and may purchase an application of a heterogeneous platform from the market server 14. Here, the application of the heterogeneous platform may be an application that operates on the heterogeneous platform instead of operating on the platform of the terminal 10. The market server 14 may transfer, to the plurality of platforms or the plurality of virtual platforms, an execution file of the application purchased by the cloud client 100 of the terminal 10.

According to an embodiment, the market server 14 for providing an integrated application market may be configured through the aforementioned operations. In addition, an environment in which an application of a heterogeneous platform may be used may be provided, and sharing and synchronization of data between the plurality of platforms may be provided.

The personal cloud storage 18 may provide sharing and synchronization of data between the platform of the terminal 10 and the platform of the virtual terminal. Here, the platform of the virtual terminal may be the aforementioned heterogeneous platform. The personal cloud storage 18 may store data using a common standard data type of the plurality of virtual terminals or the plurality of virtual platforms. A description related to the personal cloud storage 18 will be further described with reference to FIG. 3.

Figure 2:
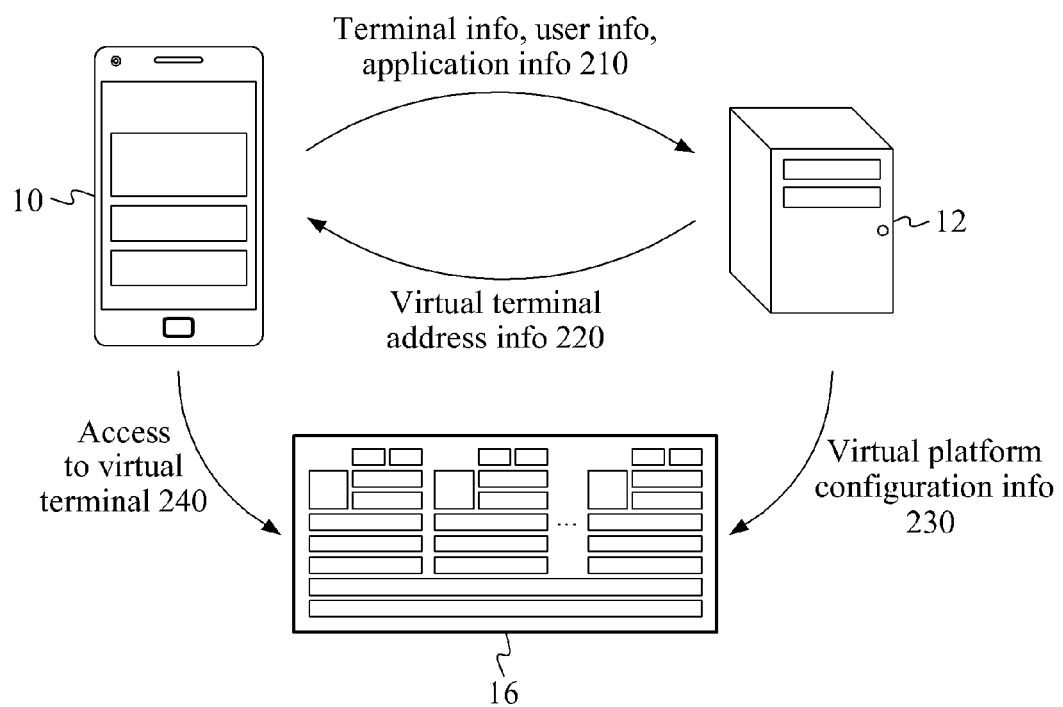
FIG. 2 is a reference diagram to describe a communication process among a terminal, a managing server, and a virtual cloud server according to an embodiment.

FIG. 2 is a reference diagram to describe a communication process among the terminal 10, the managing server 12, and the virtual cloud server 16 according to an embodiment.

In 210, the cloud client 100 of the terminal 10 may transmit terminal information, user information, and application information to the managing server 12. The terminal information may include information associated with a platform of a terminal, a type of the terminal, hardware performance of the terminal, and a telephone number of the terminal. The telephone number of the terminal may be information used to identify a user. The user information may include information associated with an identifier (ID) of the user, a password of the user, and the like. The application information may include information associated with a platform of an application, an identification name of the application, and the like.

In 220, the managing server 12 may identify a virtual terminal in which an application desired by the terminal 10 is present, among the plurality of virtual terminals configured by the virtual cloud server 166, based on the terminal information, the user information, and the application information that is received from the terminal 10. The managing server 120 may transmit virtual terminal address information to the terminal 10. The virtual terminal address information may be information associated with an address of the identified virtual terminal. Here, the application desired by the terminal may be an application that is requested by the terminal as an application indicated by the application information received in 210.

In 230, the managing server 12 may configure a cloud in the virtual cloud server 16 so that the virtual terminal in which the application requested by the terminal 10 is present may be executed. For the above configuration, the managing server 12 may transmit virtual platform configuration information to the virtual cloud server 16. The virtual platform configuration information may be information associated with a configuration of a virtual platform. The managing server 12 enables the application requested by the terminal 10 to be executed in the virtual gateway 162 of the virtual cloud server 16.

In 240, the cloud client 100 of the terminal 10 may access the cloud UI server 163 of the virtual terminal in which the application requested by the terminal 10 is present. The cloud UI server 163 of the virtual cloud server 16 may transfer a screen of the virtual gateway 162 to the terminal 10. The virtual gateway 162 may provide, to the terminal 10, an actual screen of the application requested by the terminal 10 that is executed in the virtual terminal. Through providing of the screen, the terminal 10 may display the actual screen of the application requested by the terminal 10 for the user of the terminal 10.

Figure 3:
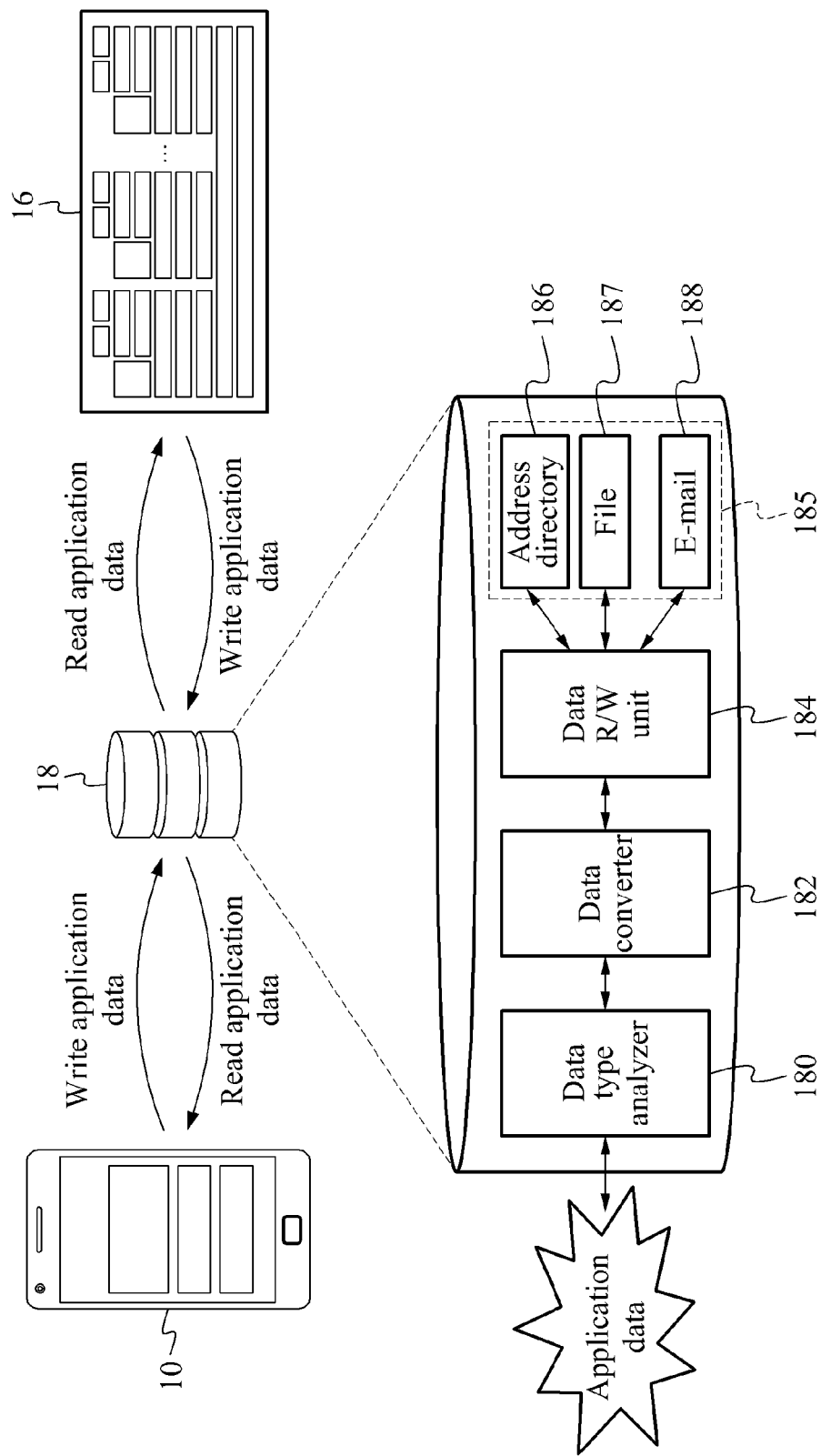
FIG. 3 is a reference diagram to describe a process of sharing and synchronizing data between a terminal and a virtual cloud server in real time according to an embodiment.

FIG. 3 is a reference diagram to describe a process of sharing and synchronizing data between the terminal 10 and the virtual cloud server 16 in real time according to an embodiment of the present invention.

Referring to FIG. 1 and FIG. 3, the terminal 10 and the virtual cloud server 16 may share and synchronize in real time data that is used or generated when executing an application of a heterogeneous platform.

The personal cloud storage 180 may include a data type analyzer 180, a data converter 182, a data read/write (R/W) unit 184, and a data storing unit 185.

To store data that is used and generated when executing an application of a platform of the virtual terminal and an application of a platform of the terminal 10, the data type analyzer 180 of the personal cloud storage 180 may verify and analyze a type of data of the personal cloud storage 180. The data converter 182 may convert data to data of a standard data type. Next, the data R/W unit 184 may store data of the standard data type in the data storing unit 150. An address directory 186, a file 187, and an e-mail 188 are illustrated as data of the standard data type. To read data, the data converter 182 may read data of the standard data type from the data R/W unit 184, and may convert the data of the standard data type to data of a data type of a platform to be used. Application data may be data of the platform to use the data. Here, the platform to use the data may be a platform of the terminal 10 or a platform of a virtual machine. Data that is converted to the data type of the platform to use the data may be transferred to the application.

Figure 4:
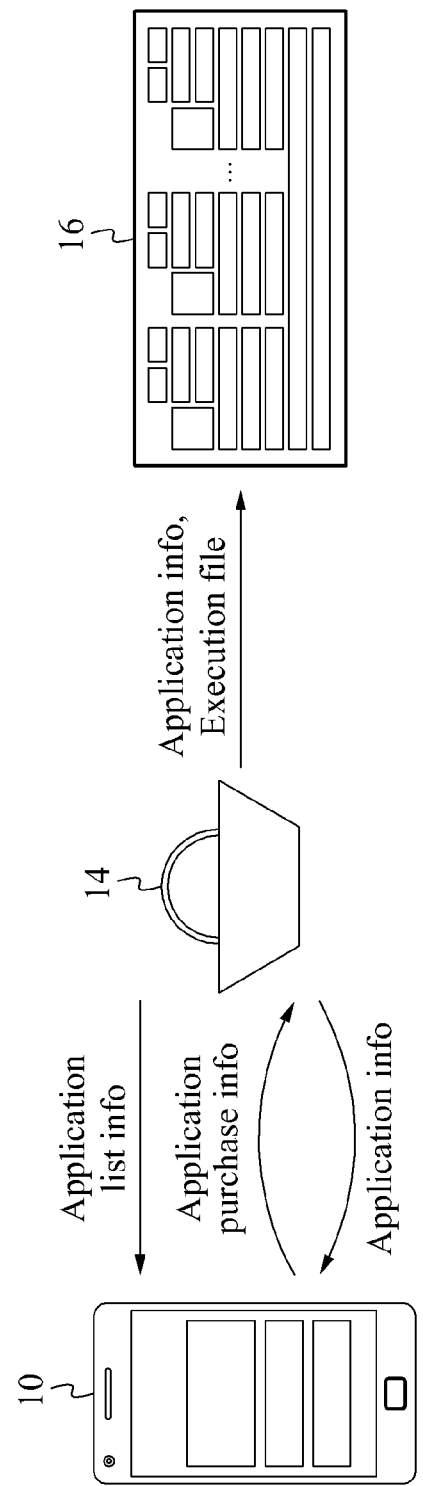
FIG. 4 is a reference diagram to describe a communication process between a market server and a virtual cloud server according to an embodiment.

FIG. 4 is a reference diagram to describe a communication process between the market server 14 and the virtual cloud server 16 according to an embodiment.

In 410, the market server 14 may transfer application list information to the cloud client 100 of the terminal 10. The application list information may be information associated with a list of applications.

The terminal 10 may select an application requested by a user from among the list of applications that is transferred through the cloud client 100. The terminal 10 may transfer, to the market server 14, application purchase information requested by the user. The application purchase information may be information associated with an application purchased by a user. The application purchase information may include information such as a platform of an application and an identification name of the application that is to be transferred through the cloud client 100 when executing the application.

The market server 14 may transfer, to the virtual terminal of the virtual cloud server 16, information associated with an application purchased by the user and an execution file of the application suitable for a platform of the virtual terminal. That is, the market server 14 may configure the application in the virtual gateway 162 of the virtual cloud server 16, and may transfer the execution file of the application to the virtual platform.

Figure 5:
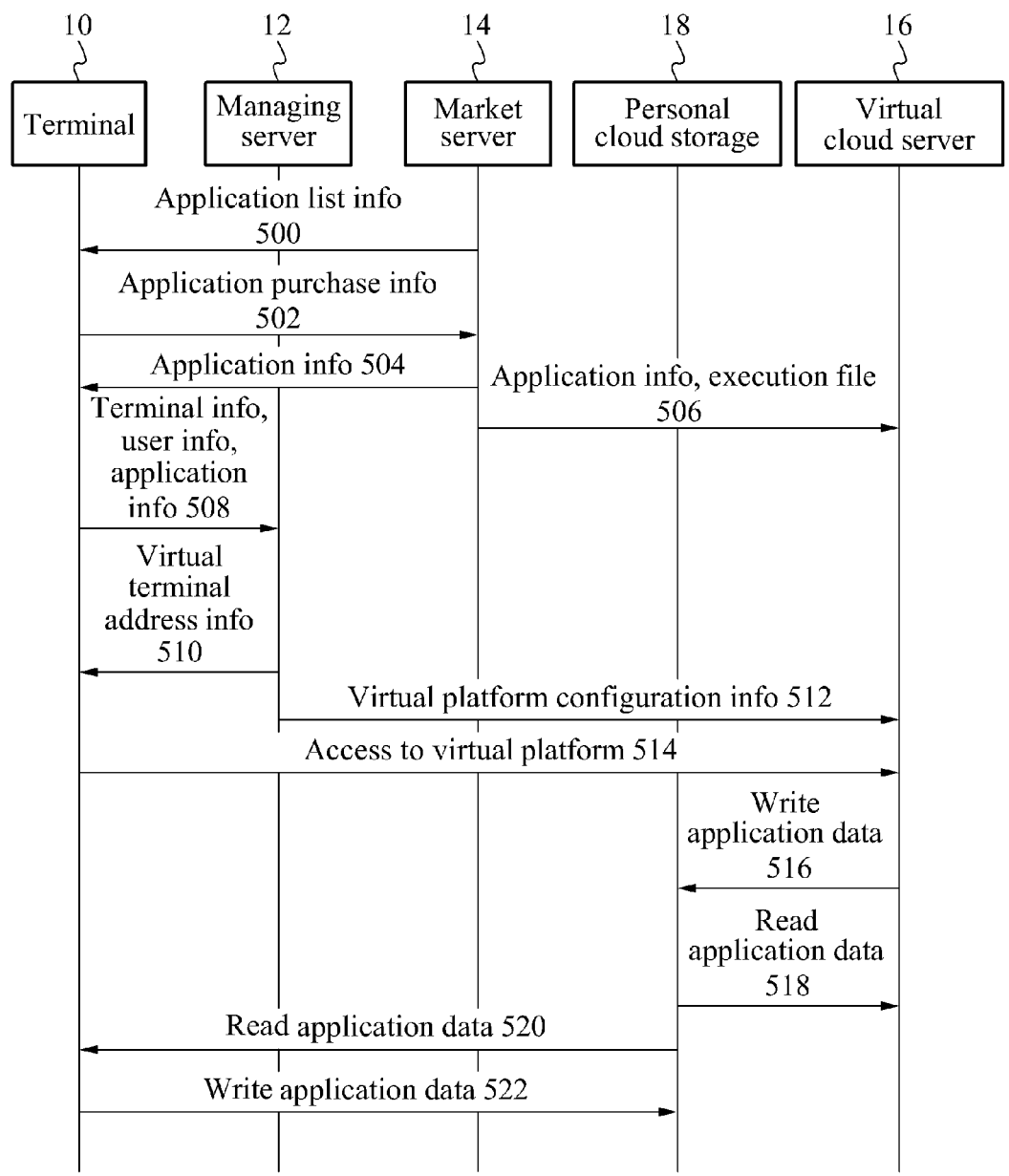
FIG. 5 is a flowchart illustrating a method of providing an application of a heterogeneous platform according to an embodiment.

FIG. 5 is a flowchart illustrating a method of providing an application of a heterogeneous platform according to an embodiment.

In operation 500, the terminal 10 may receive application list information from the market server 14.

In operation 502, the terminal 10 may transmit application purchase information to the market server 14.

In operation 504, the terminal 10 may receive, from the market server 14, information associated with an application desired to be purchased.

In operation 506, the market server 14 may provide information associated with the application and an execution file of the application to the virtual cloud server 16.

In operation 508, the terminal 10 may provide terminal information, user information, and application information to the managing server 12.

In operation 510, the terminal 10 may receive information associated with an address of the virtual terminal from the managing server 12, in response to the above providing.

In operation 512, the managing server 12 may provide information associated with a configuration of the virtual platform to the virtual cloud server 16.

In operation 514, the terminal 10 may access a platform of the virtual terminal of the virtual cloud server 16.

In operations 516 and 522, the virtual cloud server 16 and the terminal 10 may write application data in the personal cloud storage 18, respectively. Here, the application data may be data of the application that is provided to the terminal 10.

In operations 518 and 520, the virtual cloud server 16 and the terminal 10 may read the application data from the personal cloud storage 18, respectively.

The following embodiments relate to a cooperative middleware apparatus and service method for operating a plurality of different cloud servers with mutual compatibility and interoperability and thereby providing a cloud computing service to a mobile terminal in such a manner that the plurality of different cloud servers may not depend on a service type of each cloud server, an OS, and a service provider.

Figure 6:
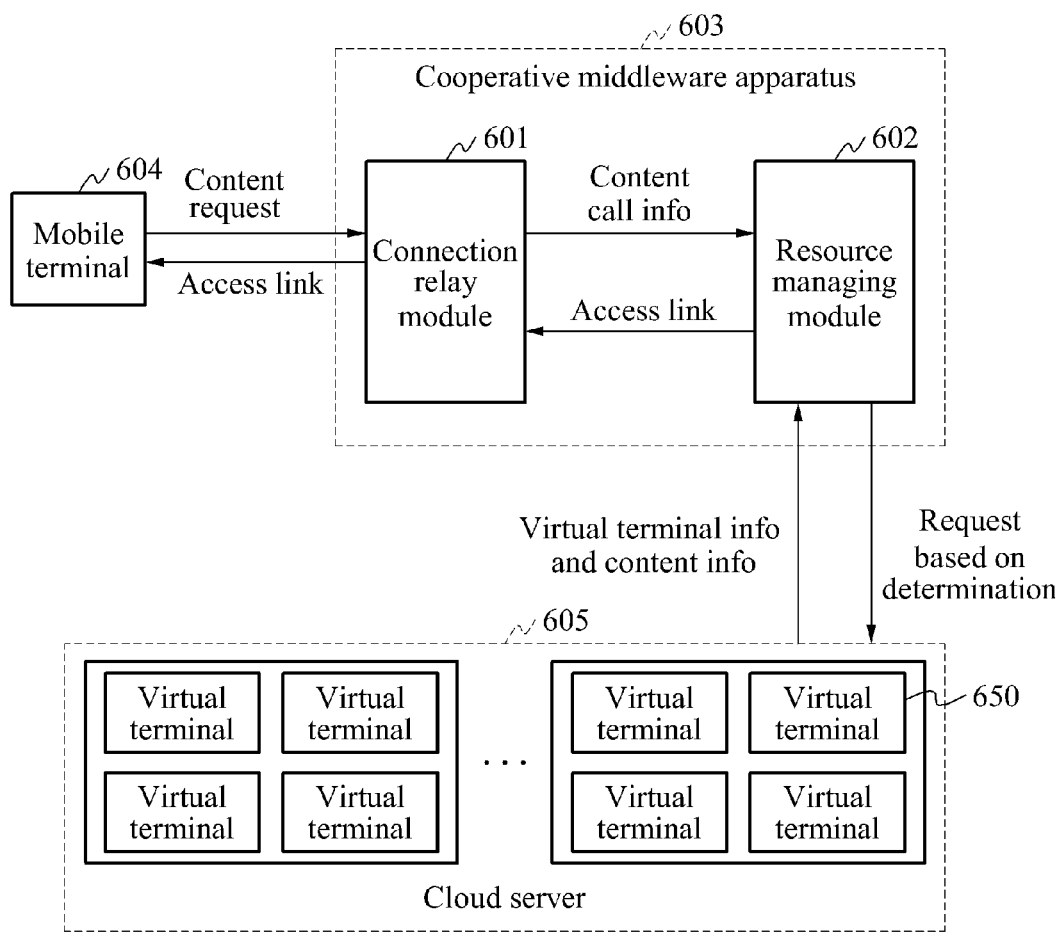
FIG. 6 is a block diagram illustrating a configuration of a cooperative middleware apparatus for an open mobile cloud environment according to an embodiment.

FIG. 6 is a block diagram illustrating a configuration of a cooperative middleware apparatus for an open mobile cloud environment according to an embodiment.

Referring to FIG. 6, a cooperative middleware apparatus 603 for an open mobile cloud environment may include a connection relay module 601 and a resource managing module 602.

The management resource module 602 may store content information and virtual terminal information that is stored in each of a plurality of cloud servers 605. The virtual terminal information may be information associated with a virtual terminal 650. The resource managing module 602 may determine a cloud server 605 suitable for a user among the plurality of cloud servers 605, based on the stored content information and virtual terminal information. Here, the user may be a mobile terminal 604.

The resource managing module 602 may verify an allocation state of virtual terminals 650 of the determined cloud server 605, and may determine whether to allocate a new virtual terminal 650 based on the verified allocation state.

The resource managing module 602 may verify a location of content to be provided to the user. When the content to be provided to the user is absent in the determined cloud server 605, the resource managing module 602 may determine migration of the content to the determined cloud server 605 from another cloud server 605 in which the content is present among the plurality of cloud servers 605. Based on whether the new virtual terminal 650 is determined to be allocated and whether the content is determined to be migrated, the resource managing module 602 may select the cloud server 605 and may request the selected cloud server 605 for allocating of the new virtual terminal 650 and migration of the content.

Also, the resource managing module 602 may generate an access link that enables an access to the virtual terminal 650 of the finally determined cloud server 605, and may transfer the generated access link to the connection relay module 601.

The resource managing module 602 may monitor quality of a service of content that is provided by the determined cloud server 605 to the user.

In response to a content request from the mobile terminal 604, the connection relay module 601 may perform authentication of the mobile terminal 604.

The connection relay module 601 may transfer content call information to the resource managing module 602. The content call information may include the content request of the mobile terminal 604, communication network connection information of the mobile terminal 604, and personal information pre-stored by the user.

The connection relay module 601 may receive the access link from the resource managing module 602, and may transfer the received access link to the mobile terminal 604. Also, the connection relay module 601 may monitor a communication state between the mobile terminal 604 and the cloud server 605 providing the content.

Figure 7:
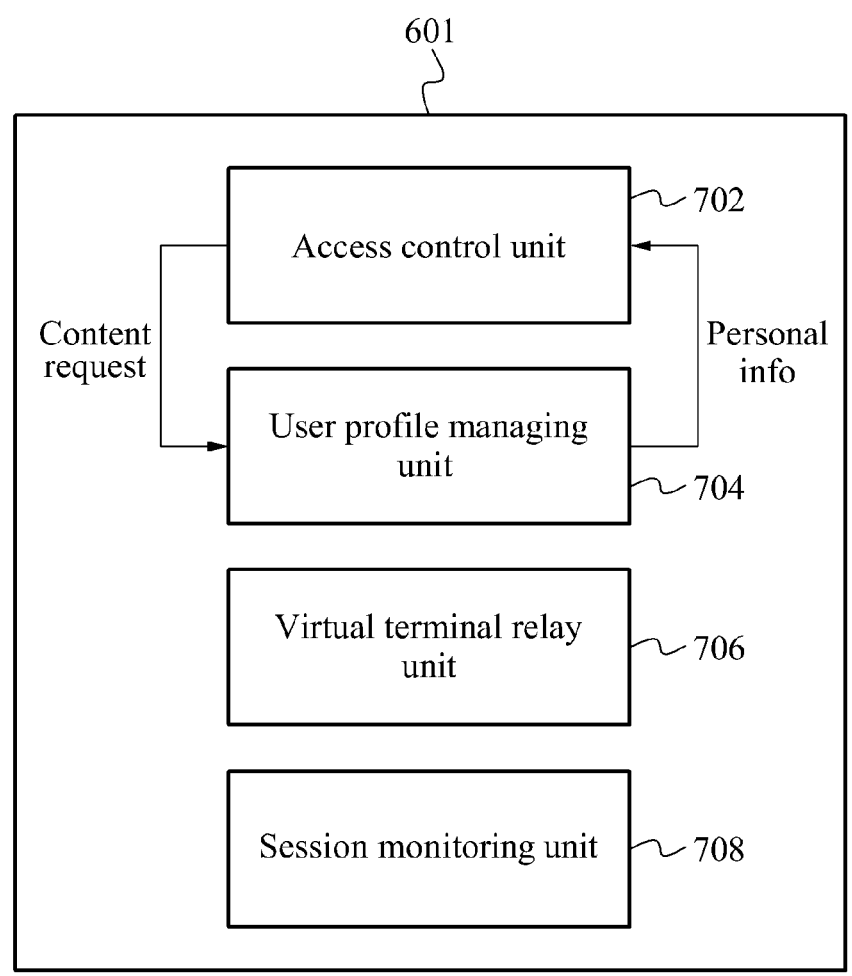
FIG. 7 is a block diagram illustrating a configuration of a connection middleware module of a cooperation middleware apparatus for an open mobile cloud environment according to an embodiment.

FIG. 7 is a block diagram illustrating a configuration of a connection middleware module of a cooperation middleware apparatus for an open mobile cloud environment according to an embodiment.

The connection relay module 601 may include an access control unit 702, a user profile managing unit 704, a virtual terminal relay unit 706, and a session monitoring unit 708.

The access control unit 702 may control connection between the mobile terminal 604 and the cooperative middleware apparatus 603. When the mobile terminal 604 accesses the cooperative middleware apparatus 603, the access control unit 702 may authenticate a user and the mobile terminal 604 based on personal information of the user that is stored in the user profile managing unit 704. Also, the access control unit 702 may verify communication network connection information including information, such as a current location of the mobile terminal 604, a type of a communication network being used by the mobile terminal 604, and a current communication state of the mobile terminal 604, by analyzing communication of the mobile terminal 604.

The user profile managing unit 704 may receive personal information of the user of the mobile terminal 604 from the mobile terminal 604, and may store the personal information in advance. When the mobile terminal 604 makes a request for content, the user profile managing unit 704 may generate content call information. The content call information may include personal information of the user of the mobile terminal 604, communication network connection information of the mobile terminal 604, and the content request. The user profile managing unit 704 may transfer the generated content call information to the resource managing module 602.

The virtual terminal relay unit 706 may transfer, to the mobile terminal 604, an access link that is transmitted from the resource managing module 602. The mobile terminal 604 may access the cloud server 605 that services content, through the connection link, and may receive a service from the accessed cloud server 605.

The session monitoring unit 708 enables a service to be smoothly provided by continuously monitoring a communication environment between the mobile terminal 604 and the cloud server 605 providing the content.

Figure 8:
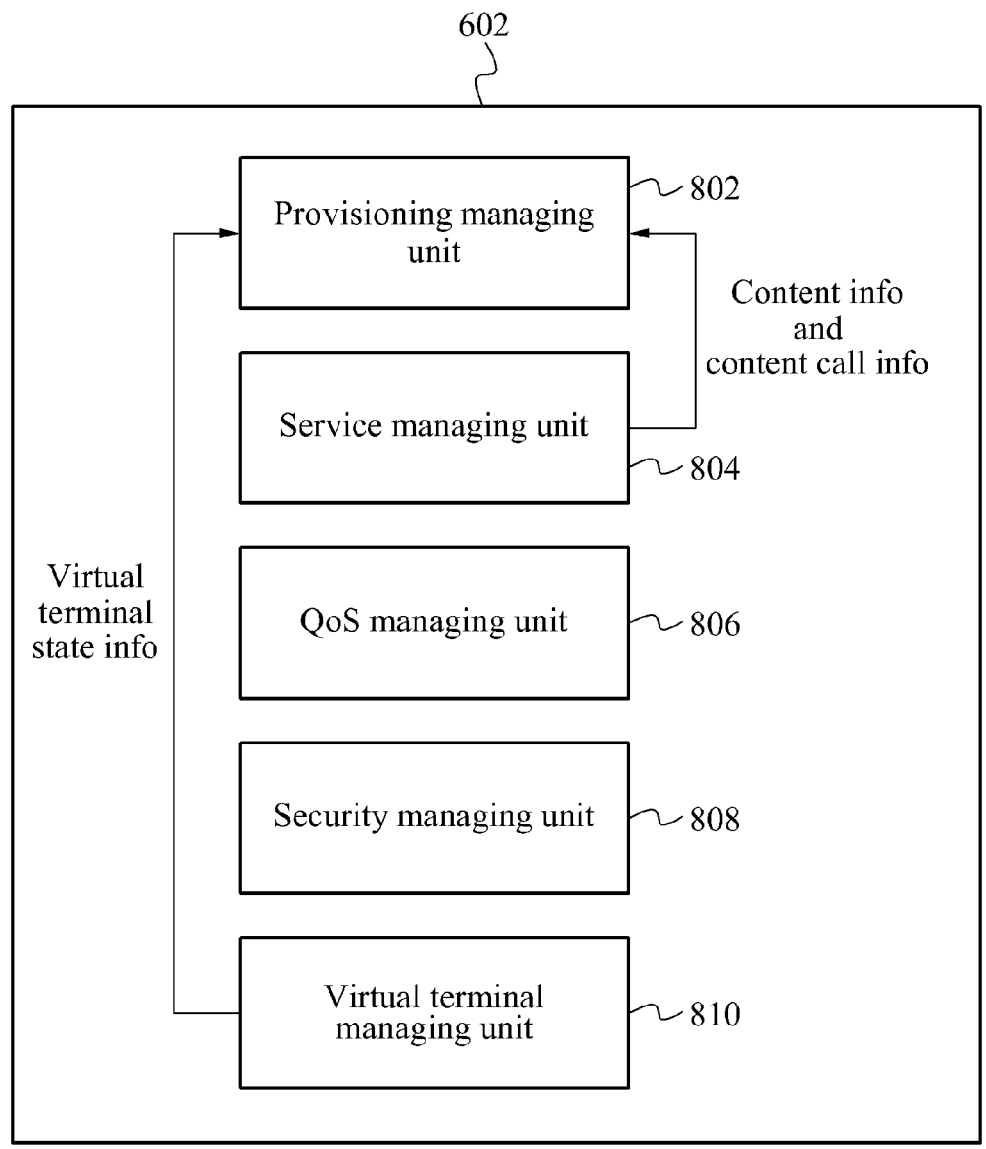
FIG. 8 is a block diagram illustrating a configuration of a resource managing module of a cooperation middleware apparatus for an open mobile cloud environment according to an embodiment.

FIG. 8 is a block diagram illustrating a configuration of a resource managing module of a cooperation middleware apparatus for an open mobile cloud environment according to an embodiment.

The resource managing module 602 may include a provisioning managing unit 802, a service managing unit 804, a QoS managing unit 806, a security managing unit 808, and a virtual terminal managing unit 810.

The service managing unit 804 may receive, from each of the plurality of client servers 605, content information associated with content maintained by a user and content that is currently stored and executed by each of the plurality of client servers 605. The service managing unit 804 may store the received content information. Also, the service managing unit 804 may determine content to be provided to the mobile terminal 604, based on content call information. When a request for content information is received, the service managing unit 804 may provide content information of the requested content.

The virtual terminal managing unit 810 may receive virtual terminal information from each of the plurality of cloud servers 605. The virtual terminal information may include information associated with the virtual terminals 650 currently allocated to each of the plurality of cloud servers 605, and information associated with an OS of each of the virtual terminals 650. The virtual terminal managing unit 810 may store the received virtual terminal information. When a request for the virtual terminal information is received, the virtual terminal managing unit 810 may provide the requested virtual terminal information.

The provisioning managing unit 802 may select a single cloud server 605 from among the plurality of cloud servers 605 based on content call information received from the connection relay module 601, content information provided from the service managing unit 804, and virtual terminal information provided from the virtual terminal managing unit 810. The provisioning managing unit 802 may verify the virtual terminals 650 allocated to the selected cloud server 605, and may search for a virtual terminal 605 capable of executing the content requested by the mobile terminal 604, from among the virtual terminals 650 allocated to the selected cloud server 605. When the virtual terminal 605 capable of executing the content requested by the mobile terminal 604 is absent, the provisioning managing unit 802 may determine that a new virtual terminal 605 is to be allocated. Also, when the content requested by the mobile terminal 604 is not stored in the selected cloud server 605, the provisioning managing unit 802 may determine that the content is to be migrated from the cloud server 605 storing the content to the selected cloud server 605. Based on the above determination, the provisioning managing unit 802 may request the selected cloud server 605 for allocating of the virtual terminal 605 and migration of the content.

The security managing unit 808 may be in charge of security over the cooperative middleware apparatus 603. The security managing unit 808 may protect personal information of the user stored in the user profile managing unit 704 and content maintained by the user, from an external attack such as a hacking attack and the like.

The QoS monitoring unit 806 may check QoS by continuously monitoring content that is executed in the cloud server 605 and is provided to the mobile terminal 604.

Figure 9:
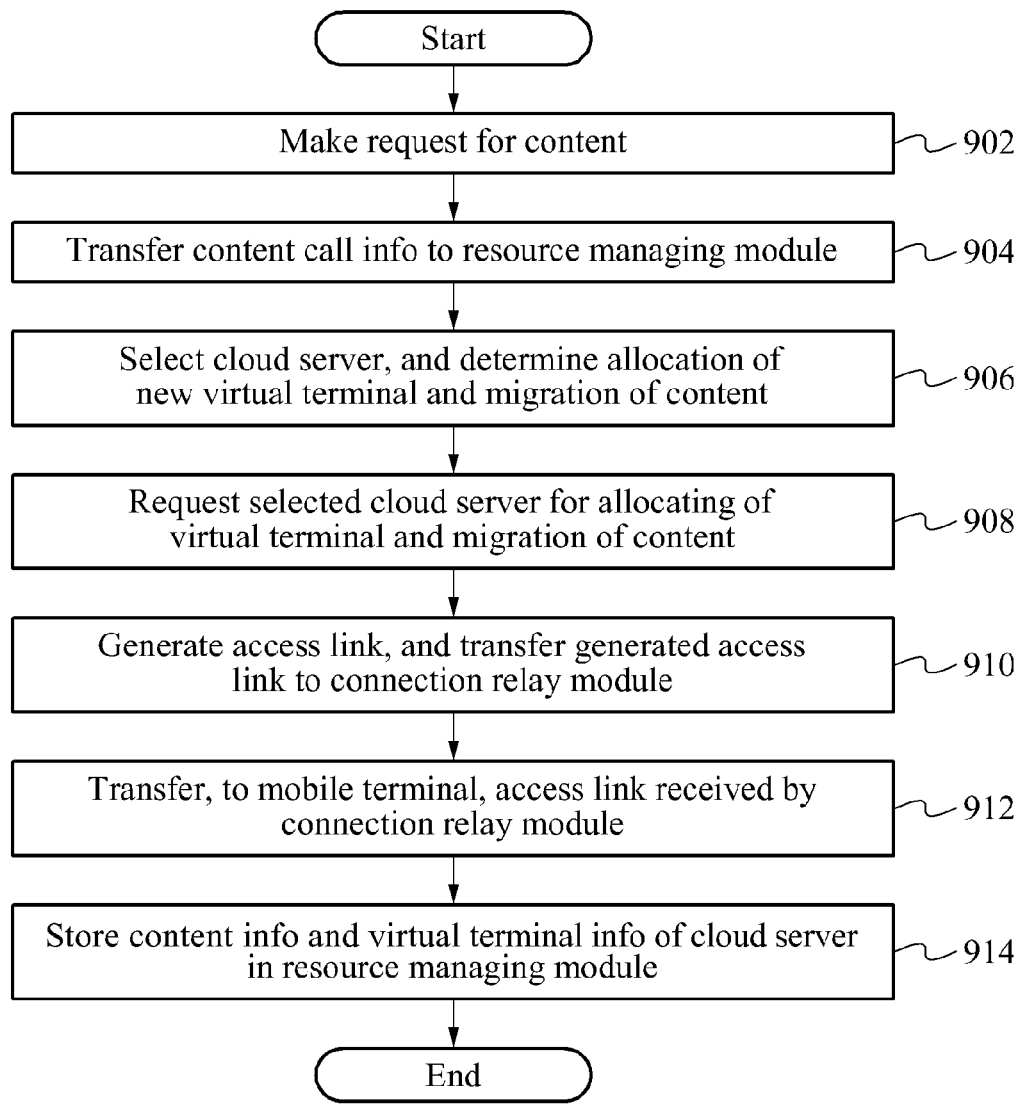
FIG. 9 is a flowchart illustrating a content providing service method of a cooperation middleware apparatus for an open mobile cloud environment according to an embodiment.

FIG. 9 is a flowchart illustrating a content providing service method of a cooperation middleware apparatus for an open mobile cloud environment according to an embodiment.

In operation 902, a mobile terminal may request the cooperative middleware apparatus for content desired by a user.

In operation 904, a connection relay module may generate content call information including a request for the received content, personal information of the user of the mobile terminal, and communication network connection information of the mobile terminal. The connection relay module may transfer the generated content call information to a resource managing module.

In operation 906, the resource managing module may select a single cloud server from among a plurality of cloud servers by using virtual terminal information in which the resource managing module is stored, and content information based on content call information received from the connection relay module. The resource managing module may determine allocation of a new virtual terminal and migration of content with respect to the selected cloud server.

In operation 908, the resource managing module may request the selected cloud server for allocating of the virtual terminal and migration of the content based on the above determination.

In operation 910, the resource managing module may generate an access link that enables an access to a virtual terminal of the selected cloud sever. The resource managing module may transfer the generated access link to the connection relay module.

In operation 912, the connection relay module may transfer, to the user terminal, the access link that is received from the resource managing module.

In operation 914, the cloud server may transfer content information and virtual terminal information to the resource managing module. The resource managing module may store the content information and the virtual terminal information.

An access control unit of the connection relay module may receive a content request from the mobile terminal, and may perform an authentication process based on personal information of a user that is stored in a user profile managing unit. The access control unit may transfer communication network connection information and a request for the content to the user profile managing unit by analyzing a current location of the mobile terminal, a type of a communication network being used by the mobile terminal, and a current communication state of the mobile terminal.

The user profile managing unit may generate content call information by integrating the communication network connection information received from the access control unit, the request for content, and personal information of the user stored in the user profile managing unit. The user profile managing unit may transfer the generated content call information to a service managing unit of the resource managing module.

The service managing unit may determine content to be provided by comparing the content call information received from the user profile managing unit and the stored content information. The service managing unit may transfer the determined content information and content call information to the provisioning managing unit.

The provisioning managing unit may request the virtual terminal managing unit for virtual terminal information based on the content information and content call information that is received from the service managing unit.

In response to the request of the provisioning managing unit, the virtual terminal managing unit may transfer the stored virtual terminal information to the provisioning managing unit.

The provisioning managing unit may select, from among a plurality of cloud servers, a cloud server suitable to provide a service to the mobile terminal based on virtual terminal information received from the virtual terminal managing unit and content information and content call information received from the service managing unit. The provisioning managing unit may select the cloud server based on a current location of the mobile terminal, a type of a communication network of the mobile terminal, and a communication state of the mobile terminal. The provisioning managing unit may verify an allocation state of virtual terminals of the selected cloud server. When a suitable virtual terminal is absent as a result of comparing an OS required by the content requested by the mobile terminal and an amount of resources of the virtual terminal with a virtual terminal of the selected cloud server, the provisioning managing unit may determine that a new virtual terminal is to be allocated. The provisioning managing unit may verify whether the requested content is present within the selected cloud server, and if required, may determine that the content is to be migrated from another cloud server. The provisioning managing unit enables the content to be executed in the selected cloud server by requesting the selected cloud server for allocation of the new virtual terminal and the migration of the content based on the determination with respect to the selected cloud server. Also, the provisioning managing unit may generate an access link that enables an access to the virtual terminal of the cloud server in which the content is executed, and may transfer the access link to a virtual terminal relay unit of the connection relay module.

The virtual terminal relay unit may provide, to the mobile terminal through the access control unit, the access link received from the provisioning managing unit.

The mobile terminal may access the cloud server through the access link received from the connection relay module, and may receive a service from the accessed cloud server. The connection relay module enables the mobile module to smoothly receive a service by continuously monitoring a communication state between the mobile terminal and the cloud server. Also, the resource managing module may guarantee excellent QoS by monitoring content provided to the mobile terminal.

Figure 10:
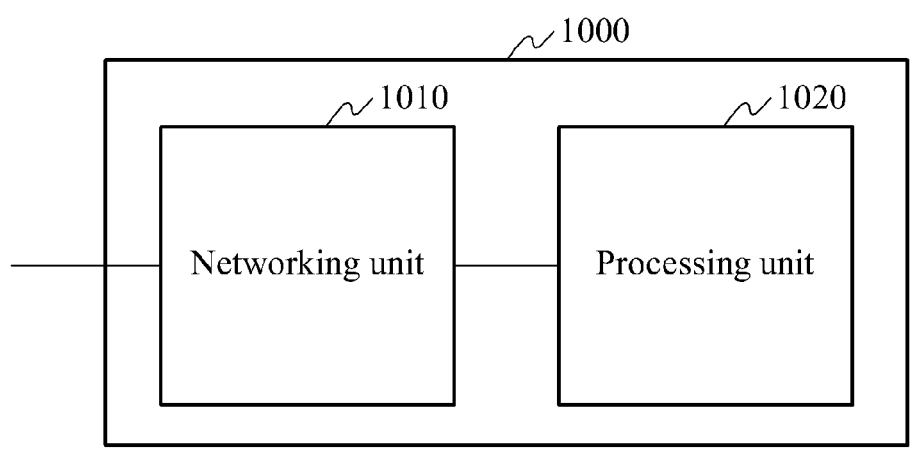
FIG. 10 is a block diagram illustrating an apparatus according to an embodiment.

FIG. 10 is a block diagram illustrating an apparatus according to an embodiment.

An apparatus 1000 may include a networking unit 1010 and a processing unit 1020.

The networking unit 1010 may be a hardware module such as a network interface card, a network interface chip, and a networking interface port, and may also be a software module such as a network device driver or a networking program.

The processing unit 1020 may be at least one processor or at least one core within a processor. The processing unit 1020 may perform a function required for operation of the apparatus 1000.

The apparatus 1000 may be a terminal, a server, or middleware described above with reference to FIG. 1 through FIG. 9. For example, the apparatus 1000 may be configured as at least one of the terminal 10, the managing server 12, the market server 14, the virtual cloud server 16, the personal cloud storage 18, the cooperative middleware apparatus 603, the mobile terminal 604, and the cloud server 605.

The networking unit 1010 may perform transmission, reception and transfer of data or information of the aforementioned terminal, server, or middleware.

The processing unit 1020 may perform functionalities of constituent elements of the aforementioned terminal, server, or middleware. The constituent elements of the aforementioned terminal, server, or middleware may indicate a code, a function, a library, a service, a process, a thread, or a module performed by the processing unit 1020.

For example, the hardware 167 may perform the networking unit 1010 and the processing unit 1020. The processing unit 1020 may execute the hypervisor 166, the VP 165, the OS 164, the cloud UI server 163, the virtual gateway 162, the emulator, the virtual platform 161, and the application 160. The processing unit 1020 may execute the cloud client 100, the platform 110, and the firmware 120. The processing unit 1020 may execute the connection relay module 601 and the resource managing module 602.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A system for providing a virtual terminal service, the system comprising:
   a virtual cloud server to configure a plurality of virtual terminals by employing a virtual machine in a cloud environment,
   wherein the virtual cloud server provides an application of a heterogeneous platform to a terminal that accesses the virtual cloud server, and
   the heterogeneous platform is a virtual platform of a virtual terminal in which the application requested by the terminal is present, among the plurality of virtual terminals, and is a platform of a heterogeneous terminal having a type different from a type of the terminal,
   wherein the terminal is authenticated by a managing server and a location address of a virtual gateway of the virtual cloud server in which the application of the heterogeneous platform is present is transferred to the terminal from the managing server.

2. The system of claim 1, wherein the managing server identifies the virtual terminal in which the application requested by the terminal is present, from among the plurality of virtual terminals based on information received from the terminal.

3. The system of claim 1, wherein the virtual cloud server enables the terminal to access the platform of the heterogeneous terminal by employing a thin client technology.

4. The system of claim 1, further comprising:
   a personal cloud storage to provide sharing and synchronization of data between a platform of the terminal and the heterogeneous platform.

5. The system of claim 1, further comprising:
   a market server to provide applications of a plurality of virtual platforms of the plurality of virtual terminals,
   wherein the terminal purchases the application of the heterogeneous platform from the market server.

6. The system of claim 5, wherein the market server transfers an execution file of the application to the heterogeneous platform.

7. A method of providing an application of a heterogeneous platform to a terminal, the method comprising:
   configuring a plurality of virtual terminals by employing a virtual machine in a cloud environment; and
   providing the application of the heterogeneous platform to the terminal,
   wherein the heterogeneous platform is a virtual platform of a virtual terminal in which the application requested by the terminal is present, among the plurality of virtual terminals, and is a platform of a heterogeneous terminal having a type different from a type of the terminal,
   wherein the terminal is authenticated by a managing server and a location address of a virtual gateway of the virtual cloud server in which the application of the heterogeneous platform is present is transferred to the terminal from the managing server.

* * * * *